United States Patent
Kezobo et al.

(10) Patent No.: US 10,421,483 B2
(45) Date of Patent: Sep. 24, 2019

(54) INPUT/OUTPUT DEVICE AND STEERING MEASUREMENT DEVICE

(71) Applicant: MITSUBISHI ELECTRIC CORPORATION, Chiyoda-ku (JP)

(72) Inventors: Isao Kezobo, Chiyoda-ku (JP); Yoshihiko Kinpara, Chiyoda-ku (JP); Hidetoshi Ikeda, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 30 days.

(21) Appl. No.: 15/126,502

(22) PCT Filed: Apr. 9, 2015

(86) PCT No.: PCT/JP2015/061088
§ 371 (c)(1),
(2) Date: Sep. 15, 2016

(87) PCT Pub. No.: WO2015/156350
PCT Pub. Date: Oct. 15, 2015

(65) Prior Publication Data
US 2017/0080970 A1    Mar. 23, 2017

(30) Foreign Application Priority Data

Apr. 10, 2014 (JP) .................. 2014-081019

(51) Int. Cl.
*B62D 5/04* (2006.01)
*B60K 35/00* (2006.01)
(Continued)

(52) U.S. Cl.
CPC ........... *B62D 5/0481* (2013.01); *B60K 35/00* (2013.01); *B60K 37/06* (2013.01); *B60Q 5/00* (2013.01);
(Continued)

(58) Field of Classification Search
CPC .......... B60K 35/00; B60K 37/06; B60Q 5/00; B62D 5/0457; B62D 5/046; G01M 7/00; G01M 17/06
(Continued)

(56) References Cited

U.S. PATENT DOCUMENTS

2008/0243399 A1    10/2008 Obata
2010/0017064 A1    1/2010 Kojima
(Continued)

FOREIGN PATENT DOCUMENTS

CN    101644629    * 2/2010
EP    2 259 041 A1    12/2010
(Continued)

OTHER PUBLICATIONS

Extended European Search Report dated Nov. 27, 2017 in European Patent Application No. 15777420.9.
International Search Report dated Jul. 7, 2015, in PCT/JP2015/061088 filed Apr. 9, 2015.
Office Action dated Aug. 14, 2018 in Chinese Patent Application No. 201580018872.3 (with English translation).

*Primary Examiner* — Maceeh Anwari
(74) *Attorney, Agent, or Firm* — Oblon, McClelland, Maier & Neustadt, L.L.P.

(57) ABSTRACT

An input/output device is connected, via an in-vehicle communication network, to a control device for controlling a motor provided in an electric power steering apparatus that is provided in a vehicle. The input/output device generates an excitation start instruction signal for starting excitation in the motor on the basis of an externally input excitation start instruction, transmits the generated excitation start instruction signal to the control device over the in-vehicle communication network, and receives response data relating to the excitation of the electric power steering apparatus, the response data being detected by the control device while the excitation is underway, from the control device over the in-vehicle communication network.

16 Claims, 11 Drawing Sheets

(51) Int. Cl.
  *B60Q 5/00* (2006.01)
  *G01M 17/06* (2006.01)
  *B60K 37/06* (2006.01)
  *G01M 7/00* (2006.01)

(52) U.S. Cl.
  CPC ........... *B62D 5/046* (2013.01); *B62D 5/0457* (2013.01); *G01M 7/00* (2013.01); *G01M 17/06* (2013.01); *B60K 2370/00* (2019.05); *B60K 2370/152* (2019.05); *B60K 2370/157* (2019.05); *B60K 2370/48* (2019.05); *B60K 2370/50* (2019.05); *B60K 2370/595* (2019.05); *B60K 2370/782* (2019.05)

(58) Field of Classification Search
  USPC .......................................................... 701/41
  See application file for complete search history.

(56) References Cited

U.S. PATENT DOCUMENTS

2012/0173079 A1\* 7/2012 Oblizajek et al. .... G01M 17/06
  701/41
2013/0090811 A1 4/2013 Maehara

FOREIGN PATENT DOCUMENTS

| JP | 2005-212706 A | 8/2005 |
| JP | 2006-153729 A | 6/2006 |
| JP | 2008-111785 A | 5/2008 |
| JP | 2008-232724 A | 10/2008 |
| JP | 2008-232724 B2 | 10/2008 |
| JP | 2013244767 A \* | 12/2013 |
| WO | WO 2012/066942 A1 | 5/2012 |

\* cited by examiner

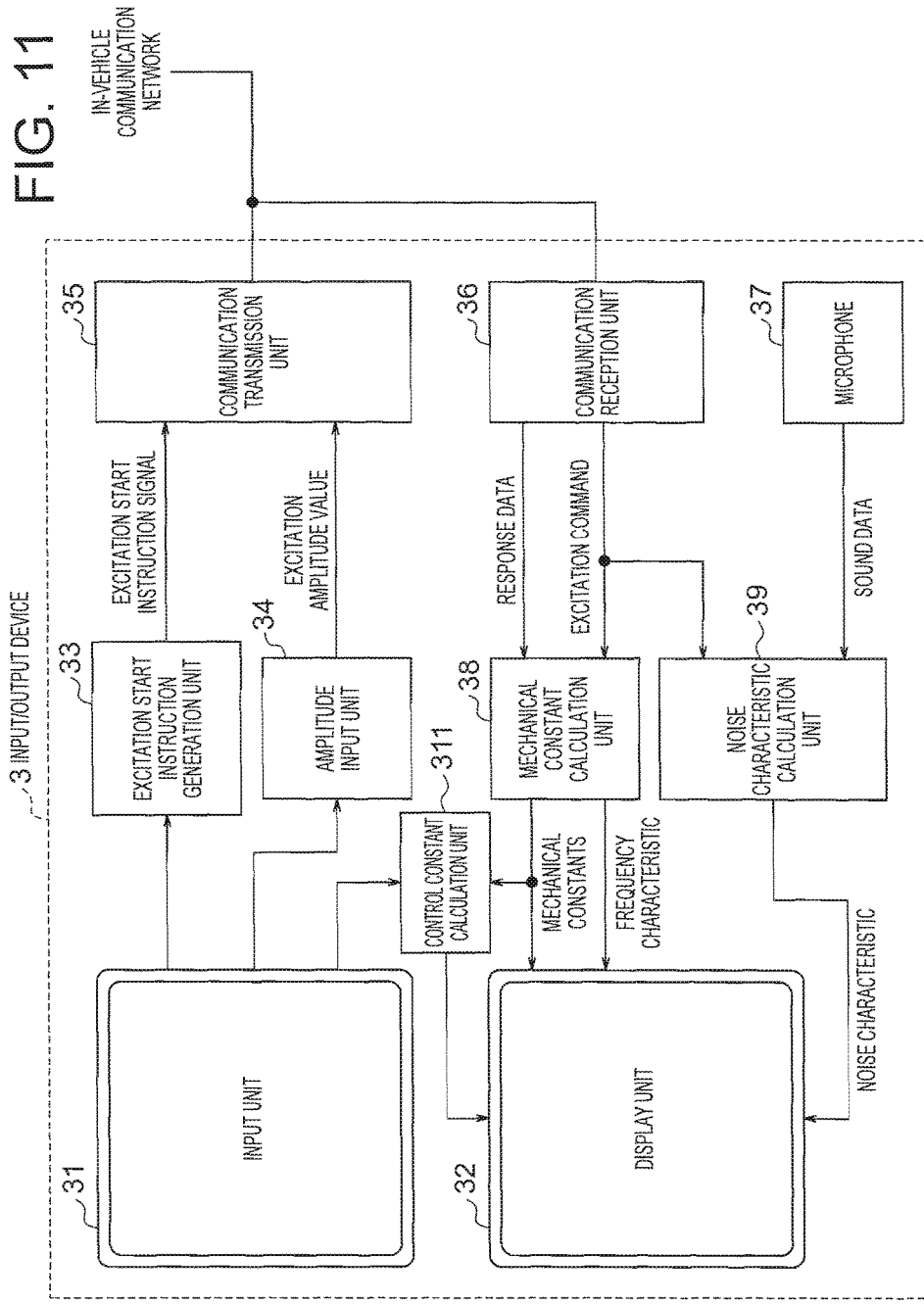

INPUT/OUTPUT DEVICE AND STEERING MEASUREMENT DEVICE

TECHNICAL FIELD

This invention relates to an input/output device and a steering measurement device, and more particularly to an input/output device for identifying mechanical constants of a steering, and a steering measurement device including the input/output device.

BACKGROUND ART

A testing device for a steering apparatus disclosed in PTL 1 is available as an example of a conventional device. In PTL 1, a testing device for testing a steering apparatus includes a master controller (a motor control device), a data logger for monitoring a torque signal, and a test signal generator for generating a test signal having a sine sweep waveform that simulates the torque signal obtained by the data logger. The master controller is configured substantially identically to a mass-produced control device (an in-vehicle controller) provided in a typical steering apparatus, and evaluates mechanical characteristics of the steering apparatus. In this testing device, a torque signal output from a torque detector (a torque sensor) provided in the steering apparatus is taken into the data logger after being subjected to AD conversion and the like directly thereby, and in a condition where the steering is fixed by a fixing device, a steering actuator is controlled in accordance with a drive signal corresponding to the sine sweep waveform generated by the test signal generator, whereby the steering is excited.

CITATION LIST

Patent Literature

[PTL 1]
Japanese Patent Application Publication No. 2008-232724

SUMMARY OF INVENTION

Technical Problem

In PTL 1, described above, an excitation control device (the master controller) for evaluating the mechanical characteristics is provided separately in the vehicle in addition to the mass-produced control device (the in-vehicle controller) provided in the steering apparatus, and the steering actuator is driven by the excitation control device (the master controller). Hence, two control devices are required. Moreover, the output of the torque sensor is taken in after being subjected to AD conversion and the like directly by the testing device, and therefore a sensor signal line and a drive signal line must be connected alternately to the testing device. As a result, increases in structural complexity, laboriousness, and cost occur.

Further, a communication network that connects electrical components installed in a vehicle to each other typically has a low communication speed with respect to a frequency band to be measured, and therefore, in PTL 1, which uses such a communication network, a high frequency component cannot be transmitted in real time. As a result, it is difficult to excite an electric power steering apparatus up to a high frequency via the in-vehicle communication network in order to measure response data up to a high frequency.

This invention has been designed to solve the problems described above, and an object thereof is to obtain a steering measurement device with which mechanical characteristics of a steering can be identified easily by means of a simple configuration.

Solution to Problem

This invention is an input/output device that is connected, via an in-vehicle communication network provided in a vehicle, to a control device for controlling a motor provided in an electric power steering apparatus that generates an auxiliary steering force applied to a steering apparatus provided in the vehicle, wherein the input/output device generates an excitation start instruction signal for starting excitation in the motor on the basis of an externally input excitation start instruction, transmits the excitation start instruction signal to the control device over the in-vehicle communication network, and receives response data relating to the excitation of the electric power steering apparatus, the response data being detected by the control device while the excitation is underway, from the control device over the in-vehicle communication network.

Advantageous Effects of Invention

According to this invention, the input/output device and the control device exchange the excitation start instruction and the excitation response data over the in-vehicle communication network. Therefore, a motor control device provided in electric power steering apparatus can be appropriated to perform test excitation, and the response data detected by the control device can also be used. As a result, only a small wiring operation is required, and mechanical characteristics can be identified easily by means of a simple configuration.

BRIEF DESCRIPTION OF DRAWINGS

FIG. 11 is a block diagram showing an input/output device according to a fourth embodiment of this invention.

DESCRIPTION OF EMBODIMENTS

First Embodiment

Figure 1:
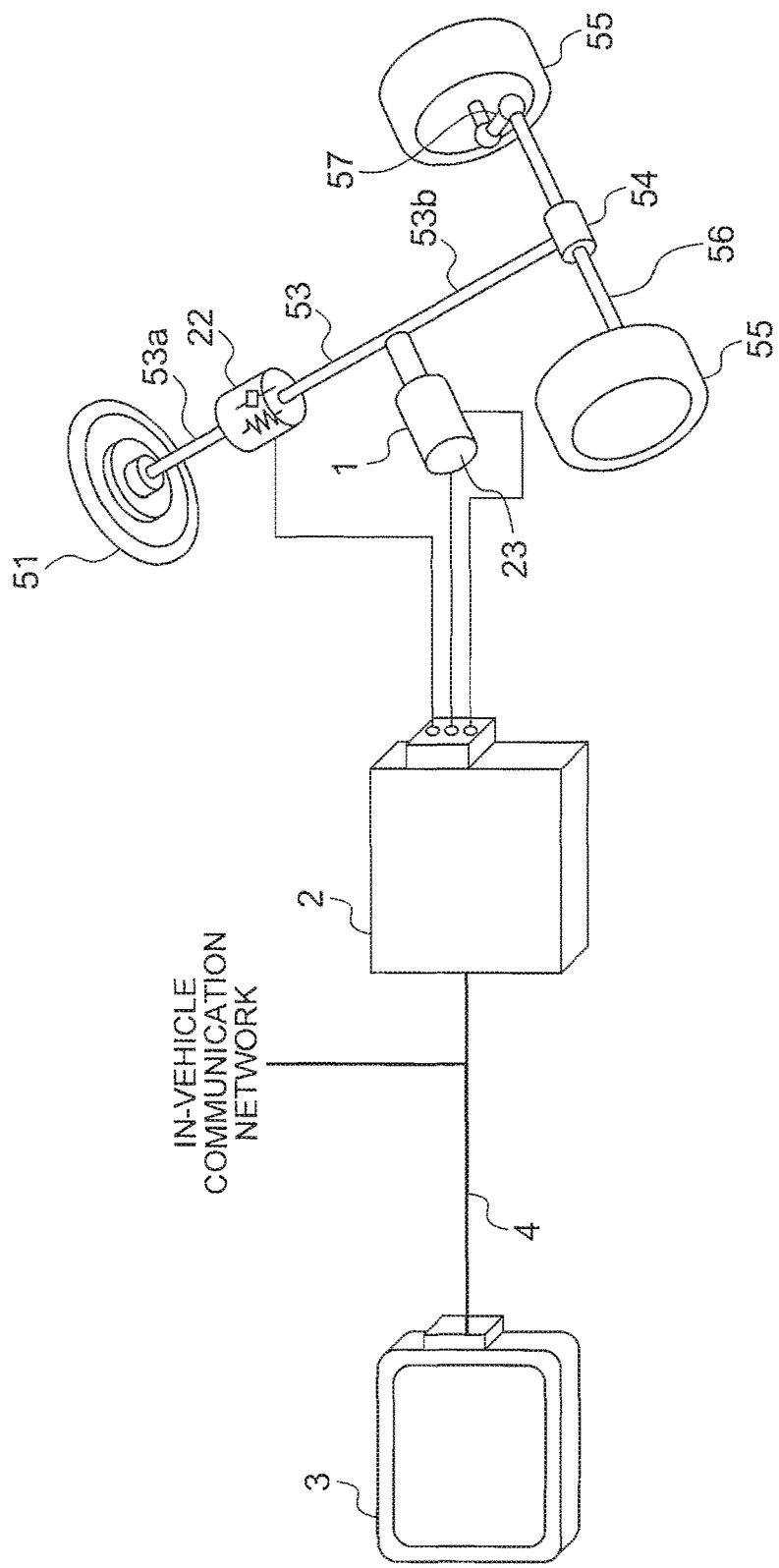
FIG. 1 is a view showing a configuration of a steering measurement device and an electric power steering apparatus according to a first embodiment of this invention.

FIG. 1 is a view showing a configuration of a steering measurement device and an electric power steering apparatus according to a first embodiment of this invention. In FIG. 1, the electric power steering apparatus is provided with a steering wheel 51, a steering shaft 53, a rack and pinion gear 54, vehicle wheels 55, a tie rod 56, a knuckle arm 57, a motor 1, a control device 2, a rotation detector 23, and a torque detector 22. This hardware configuration is similar to that of a conventional electric power steering apparatus, and is a mass-produced configuration for installation in a vehicle. Note, however, that as software packaged in the control device 2, processing communication reception unit 26 and an excitation command generation unit 25, to be described below) for receiving an excitation start instruction signal and an excitation amplitude value and generating an excitation command, and processing (a communication transmission unit 27) for transmitting the excitation command together with response data obtained as a result of excitation are added to existing software of the control device, and the control device 2 differs from an existing control device in terms of this point. This difference will be described in detail below.

The steering shaft 53 is formed from an input shaft 53$a$ coupled to the steering wheel 51 side, and an output shaft 53$b$ coupled to the rack and pinion gear 54 side. The input shaft 53$a$ and the output shaft 53$b$ are coupled to each other by a torsion bar (not shown). The torsion bar is disposed in the torque detector 22 so as to penetrate the torque detector 22 in an axial direction. Torsion is generated in the torsion bar in accordance with a steering torque exerted on the steering wheel 51 during a steering wheel operation performed by a driver (not shown), and the torque detector 22 detects a direction and an amount of the torsion. Note that hereafter, the steering wheel 51, the steering shaft 53, and the torsion bar will be referred to collectively as a steering.

Further, the input/output device 3 is connected to the control device 2 via an in-vehicle communication network for use during a measurement test performed to identify mechanical constants of the steering. The in-vehicle communication network is installed in the vehicle as a communication network that connects electrical components installed in the vehicle to each other so that data can be exchanged therebetween. The in-vehicle communication network is installed as normal in a mass-produced vehicle. During the measurement test, the in-vehicle communication network is also used to connect the control device 2 to the input/output device 3 via an in-vehicle communication network cable 4.

The steering measurement device according to this embodiment is a device for performing a measurement test to identify mechanical constants of an electric power steering apparatus. The steering measurement device according to this embodiment is constituted by the control device 2, the rotation detector 23, and the torque detector 22, which belong to the mass-produced electric power steering apparatus installed in the vehicle, and the input/output device 3, which is connected to these components by the in-vehicle communication network cable 4 for use during the measurement test. Hence, the steering measurement device according to this embodiment uses the motor 1, control device 2, rotation detector 23, and torque detector 22 provided in the electric power steering apparatus.

Here, examples of types of in-vehicle communication networks include a CAN (Controller Area Network; registered JP trademark), a FlexRay (registered JP trademark), Ethernet (registered JP trademark), and so on, and the in-vehicle communication cable may be laid in accordance with the type of network installed in the vehicle.

Hence, the steering measurement device according to this embodiment includes the control device 2 controlling the motor 1, which is provided in the electric power steering apparatus in order to generate an auxiliary steering force to be applied to the steering provided in the vehicle, and the input/output device 3 that is connected to the control device 2 via the in-vehicle communication network installed in the vehicle. The input/output device 3 includes an excitation start instruction generation unit that generates an excitation start instruction signal on the basis of an externally input excitation start instruction in order to start excitation of the motor 1, a communication transmission unit that transmits the excitation start instruction signal to the control device 2 over the in-vehicle communication network, and a communication reception unit that receives response data relating to the excitation of the electric power steering apparatus, the response data being detected by the control device 2 while the excitation is underway, from the control device 2 over the in-vehicle communication network. The control device 2, having received the excitation start instruction from the input/output device 3, excites the motor 1, detects a response of the electric power steering apparatus to the excitation, and transmits the response to the input/output device 3 as the response data. According to this configuration, the excitation start instruction and the excitation response data can be exchanged between the input/output device 3 and the control device 2 over the in-vehicle communication network, and therefore the mass-produced control device 2 installed in the steering can be used both to excite the motor 1 and to detect the response data. As a result, striking effects not present in the prior art, namely that only a small wiring operation is required and that the mechanical characteristics can be identified easily by means of a simple configuration, can be obtained.

Furthermore, according to this embodiment, an in-vehicle communication network having a low communication speed is used, but since the input/output device 3 need only transmit the excitation start instruction and the actual excitation is performed in real time by the control device 2, excitation can be performed up to a high frequency component. Moreover, the response data are detected in real time by the detectors 22, 23 of the control device 2, and therefore response data including high frequency components can be detected with a high degree of precision, whereupon the input/output device 3 can receive the detected response data including the high frequency components via the in-vehicle communication network. In other words, the control device 2 can perform actual excitation and response detection in real time even when an in-vehicle communication network having a low communication speed is used, and as a result, further effects are obtained, namely that excitation and measurement can be performed up to a high frequency component and that the characteristics of the steering can be measured with a high degree of precision.

Moreover, in this embodiment, the existing control device 2 provided in the electric power steering apparatus can be appropriated for use, thereby eliminating the need to provide a separate control device used for testing, as described in PTL 1. As a result, further effects are obtained, namely that a simple configuration can be provided, labor involved in wiring and the like can be facilitated, and costs can be reduced.

This will now be described in detail.

Figure 2:
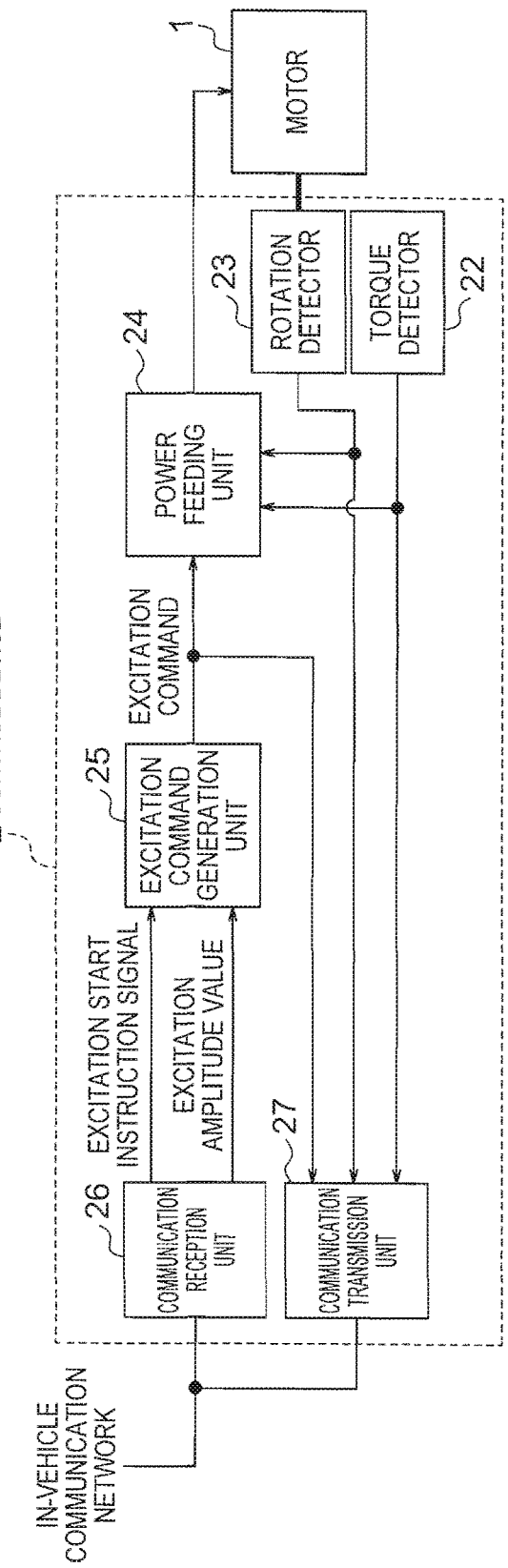
FIG. 2 is a block diagram showing a control device according to the first embodiment of this invention.

FIG. 2 is a block diagram showing an interior configuration of the control device 2 according to the first embodiment. As shown in FIG. 2, the control device 2 includes the communication reception unit 26 that receives the excitation start instruction signal and the excitation amplitude value input into the input/output device 3, the excitation command generation unit 25 that generates the excitation command on the basis of the excitation start instruction signal and the excitation amplitude value, a power feeding unit 24 that excites the motor 1 by applying a voltage to the motor 1 on the basis of the excitation command and detection values from the torque detector 22 and the rotation detector 23, to be described below, the torque detector 22 and the rotation detector 23, which respectively detect the steering torque and the rotation speed of the motor 1 during excitation thereof, and the communication transmission unit 27 that transmits the excitation command generated by the excitation command generation unit 25 and the response data to the input/output device 3. Note that the response data include the detected steering torque and rotation speed. Of these units, existing units provided in a typical control device for an electric power steering apparatus may be appropriated for use as the power feeding unit 24, the torque detector 22, and the rotation detector 23.

Next, an operation of the electric power steering apparatus will be described. In FIG. 1, the steering torque exerted on the steering wheel 51 during a steering wheel operation performed by the driver (not shown) is transmitted through the torsion bar provided in the torque detector 22 and the steering shaft 53, and then transmitted through the rack and pinion gear 54 to a rack (not shown) provided in the rack and pinion gear 54. The rack is coupled to the vehicle wheels 55 via the tie rod 56 and the knuckle arm 57. Hence, when the steering torque is transmitted to the rack during the steering wheel operation, the tie rod 56 pushes the knuckle arm 57 in the vehicle wheel 55 on one side and pulls the knuckle arm 57 in the vehicle wheel 55 on an opposite side such that a steering angle is applied to the vehicle wheels 55, and as a result, the vehicle wheels 55 are turned. Meanwhile, an output torque generated from the motor 1 is transmitted to the steering shaft 53 as an auxiliary steering force, thereby reducing the steering torque applied by the driver during steering. The motor 1 is constituted by an AC motor such as a permanent magnet synchronous motor or an induction motor, or by a DC motor, for example.

The torque detector 22 detects a steering torque applied to the torsion bar when the driver steers the steering wheel 51. When the steering torque is applied, torsion that is substantially commensurate with the steering torque is generated in the torsion bar. A torsion angle of the torsion is detected by the torque detector 22 and converted into a steering torque signal Ts. The rotation detector 23 is attached to a rotary shaft of the motor 1 in order to detect a rotation speed of the rotary shaft and output a rotation speed signal $\omega m$.

The power feeding unit 24 provided in the control device 2 receives the steering torque signal Ts detected by the torque detector 22 and the rotation speed signal $\omega m$ detected by the rotation detector 23, and determines a current command corresponding to an output torque to be output by the motor 1 in accordance with the signals. To cause the motor 1 to generate this output torque, the power feeding unit 24 generates a voltage command for controlling a current to be supplied to the motor 1 on the basis of the current command, and applies a voltage to the motor 1 using a drive circuit, not shown in the drawings, in accordance with the voltage command so that the current is supplied thereto. Further, the control device 2 includes the communication reception unit 26 and the communication transmission unit 27, and uses these units to form connections to other electrical components installed in the vehicle, such as an antiskid device, for example, via the in-vehicle communication network so that information detected by the respective detectors and the like can be exchanged and used to control the vehicle in a more sophisticated manner. The electric power steering apparatus installed in the vehicle is configured as described above so as to function as a driving assistance apparatus that exerts the auxiliary steering force generated by the motor 1 on the steering wheel 51.

An operation performed by the steering measurement device according to the first embodiment in order to identify the mechanical constants of the steering will be described below.

Figure 3:
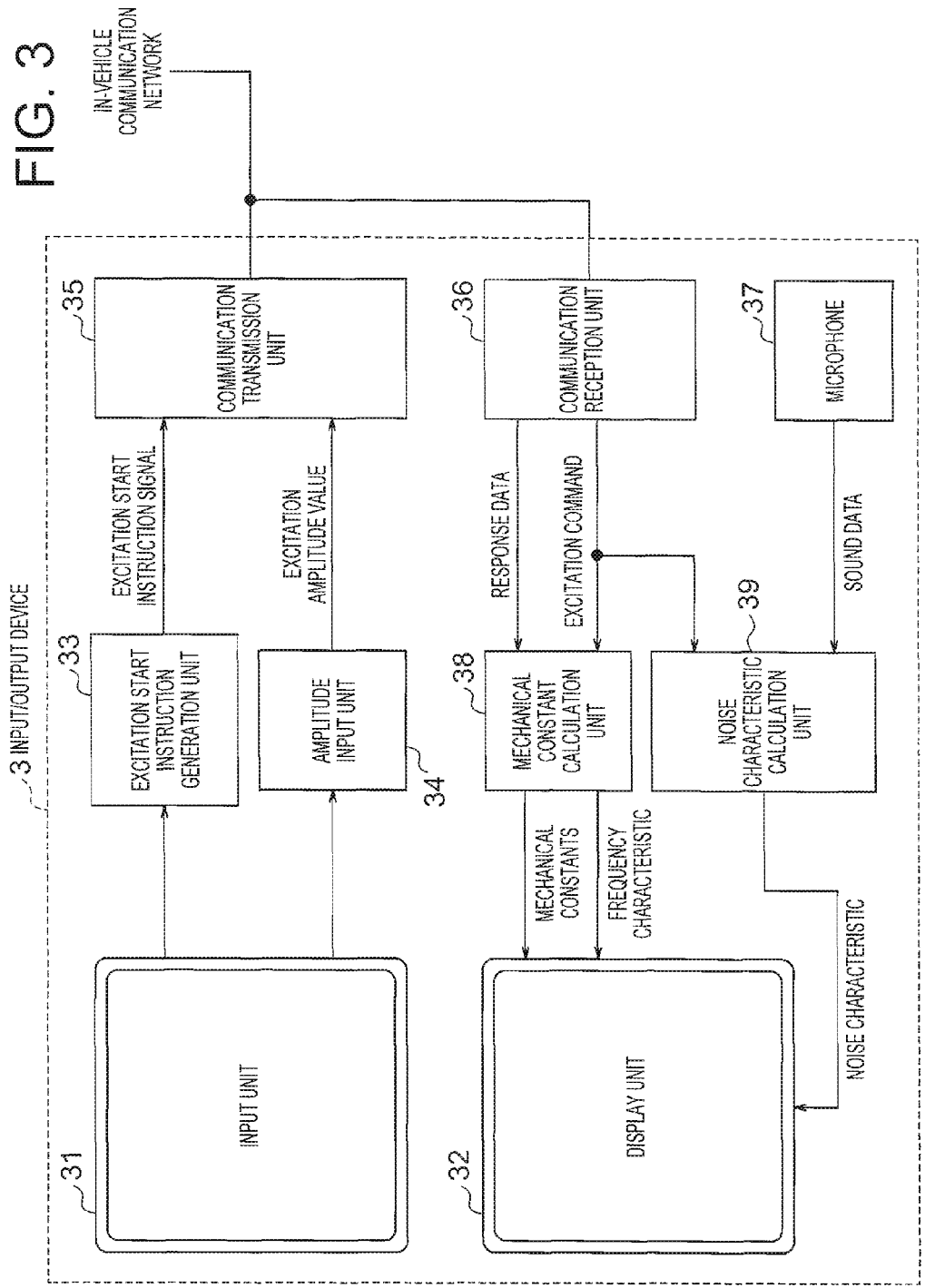
FIG. 3 is a block diagram showing an input/output device according to the first embodiment of this invention.

The input/output device 3 is configured as shown in FIG. 3, and includes, as a user interface used by a user (a tester) in a measurement test for identifying the mechanical constants, an input unit 31, a display unit 32, a communication reception unit 36, a communication transmission unit 35, and a microphone 37. The input/output device 3 performs various types of processing on the basis of input from the user, which is input from the input unit 31, information received from the control device 2 via the communication reception unit 36, which is connected to the in-vehicle communication network, and sound data detected by the microphone 37. Further, the input/output device 3 transmits processing results to the control device 2 via the communication transmission unit 35, which is connected to the in-vehicle communication network, and displays the processing results on the display unit 32.

As hardware constituting these units, the input/output device 3 may employ a communication terminal such as a tablet computer or a laptop type personal computer, for example. When a tablet computer is employed, a touch panel type display may be used as both the input unit 31 and the display unit 32. When a laptop type personal computer is used, the input unit 31 may be constituted by a keyboard and a mouse, and the display unit 32 may be constituted by a display. Further, both a tablet computer and a laptop type personal computer usually include an inbuilt microphone, and therefore the inbuilt microphone may be used as the microphone 37. When an inbuilt microphone is not provided or when the user wishes to use a microphone having a different degree of precision, a microphone or a noise meter may be prepared separately, and an output thereof may be connected to the input/output device 3 so that the sound data can be transmitted in a similar manner.

Next, an operation performed by the input/output device 3 in relation to excitation of the steering will be described. The input unit 31 includes an amplitude specification unit (not shown) and an excitation start instruction unit (not shown) which are constituted by a touch panel display or by a keyboard and a mouse and used by the user (the tester) to perform input operations. When a measurement test is performed, first, the user confirms that the steering wheel 51 is in a released condition, and then specifies an amplitude value indicating an amplitude of the excitation command on the amplitude specification unit. The amplitude value may be specified by directly inputting a numerical value or selecting a value from an amplitude value list prepared in advance. The amplitude input unit 34, upon reception of the specified amplitude value, converts the amplitude value into numerical value data and transmits the numerical value data to the communication transmission unit 35 as an excitation amplitude value. Note that the excitation amplitude value is used by the control device 2 when generating the excitation command in the excitation command generation unit 25. Next, the user specifies the start of excitation on the excitation start instruction unit of the input unit 31. The user inputs the instruction by touching the excitation start instruction unit, which is constituted by a switch. The excitation start instruction unit may be constituted by a touch panel display or a keyboard and a mouse instead of a switch. When the start instruction is input on the excitation start instruction unit, the excitation start instruction generation unit 33 generates the excitation start instruction signal as a pulse signal having an extremely short pulse duration or the like, and transmits the generated excitation start instruction signal to the communication transmission unit 35. Note that the excitation start instruction signal is used by the control device 2 as a timing signal for outputting the excitation command.

Next, an operation performed by the control device 2 in relation to excitation of the steering will be described.

As shown in FIG. 2, the control device 2 receives the excitation start instruction signal and the excitation amplitude value from the input/output device 3 in the communication reception unit 26 over the in-vehicle communication network, and transmits the received excitation start instruction signal and excitation amplitude value to the excitation command generation unit 25. The excitation command generation unit 25 generates the excitation command on the basis of the excitation amplitude value, and outputs the excitation command at a timing at which the pulse of the excitation start instruction signal is received. The excitation command generation unit 25 generates the excitation command using a typical, well-known pseudorandom number generation method employing an m-sequence, for example. This generation method can be expressed by a linear recurrence relation, and is implemented as software in the form of a linear feedback shift register or the like. According to this generation method, when a number of bits is set as n in binary digits, a period of the m-sequence is expressed by $(2^n-1) \times \Delta T$, where $\Delta T$ denotes a calculation period. The excitation command is generated by multiplying the excitation amplitude value by a pseudorandom number generated by the m-sequence. Further, the period of the m-sequence is set as an excitation period, i.e. a period in which the motor 1 is excited in response to the excitation command, and following the elapse of the excitation period, the excitation command is returned to zero, whereby the excitation command is halted. The excitation command generated in this manner is input into the power feeding unit 24 as a current command, and the power feeding unit 24 controls the current so as to follow the excitation command, thereby causing the motor 1 to generate torque corresponding to the excitation command. As a result, the motor 1 is excited. Note that here, the excitation command is handled as a current command, but torque (excitation torque) substantially corresponding to the excitation command is generated likewise when the excitation command is input into the power feeding unit 24 in the form of a voltage command, and as a result, similar effects are obtained.

Figure 7:
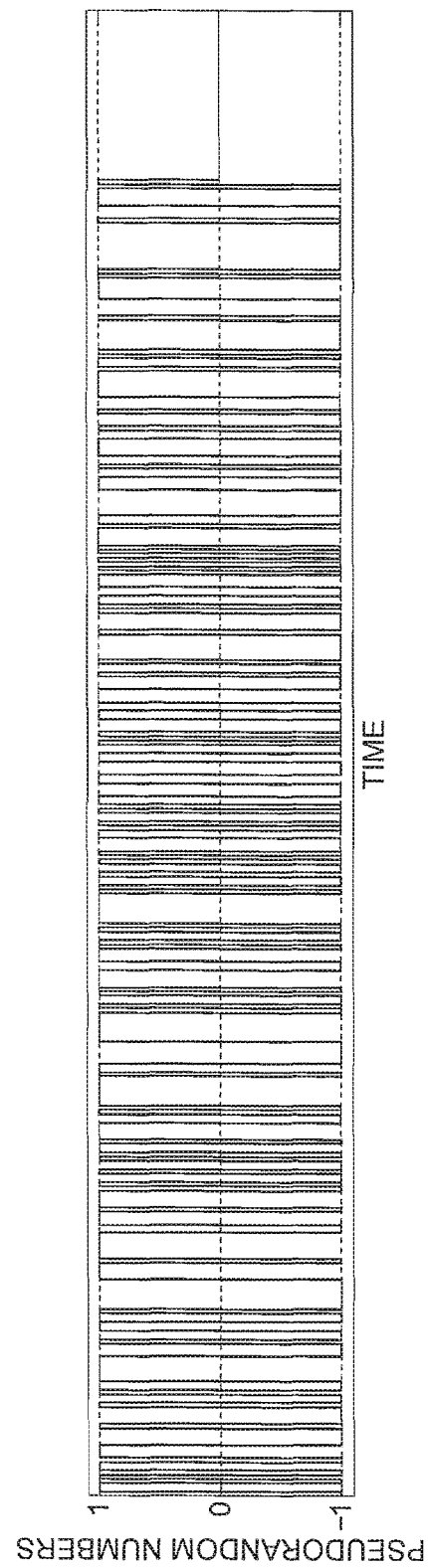
FIG. 7 is a diagram showing a waveform partially denoting pseudo-random numbers according to the first embodiment of this invention.

FIG. 7 is a view showing a waveform of the pseudorandom numbers generated by the m-sequence. The pseudorandom number waveform shown in FIG. 7 includes substantially even frequency components in a lower frequency band than a maximum frequency determined by the calculation period. Further, whereas a sine sweep waveform includes only a single frequency component at a certain time, a pseudorandom number or random number waveform generated by an m-sequence or the like includes a plurality of frequency components at a certain time. Therefore, excitation can be performed over a wide frequency band within a short excitation period, and as a result, a frequency characteristic of the steering can be obtained efficiently. Note that the example waveform in FIG. 7 shows only a part of a single period of the m-sequence rather than an entire period.

As described above, therefore, a feature of the software packaged in the control device 2 is that the processing (the communication reception unit 26 and the excitation command generation unit 25) for receiving the excitation start instruction signal and the excitation amplitude value and generating the excitation command, and the processing (the communication transmission unit 27) for transmitting the excitation command and the response data obtained as a result of the excitation to the input/output device 3 are added. Hence, the control device 2 according to this embodiment is formed by adding a program for realizing this processing to the software of the existing control device.

Next, parts of the control device 2 and the input/output device 3 relating to excitation response operations and processing will be described.

When the power feeding unit 24 is driven, torque (excitation torque) corresponding to the excitation command generated by the excitation command generation unit 25 is generated from the motor 1, and this excitation torque is transmitted via the steering shaft 53 to the torsion bar provided in the torque detector 22, the steering wheel 51, the rack and pinion gear 54, and the vehicle wheels 55. Hence, the excitation torque is transmitted to the respective sites in accordance with a mechanical transmission characteristic the steering, causing the respective sites to vibrate. The amplitude and phase of the vibration vary at respective frequency components, thereby producing a response in the form of a rotation angle, a rotation speed, and a steering torque. The response to the excitation command is detected by the rotation detector 23 and the torque detector 22 of the control device 2, whereupon the rotation speed signal and the steering torque signal are output as the response data. Furthermore, noise excited by the mechanical vibration described above is generated in the interior of the vehicle, and this noise is detected by the microphone 37 other words, a sound detector) of the input/output device 3 and output as sound data. Meanwhile, the response data including the rotation speed signal and the steering torque signal detected by the rotation detector 23 and the torque detector 22 are transmitted to the communication transmission unit 27 together with the excitation command generated by the excitation command generation unit 25, and then transmitted to the input/output device 3 over the in-vehicle communication network. An extremely short delay period exists between the excitation command and the response data due to a detection delay in the detectors 22, 23 and the calculation period, but the data are obtained substantially synchronously at an identical timing, and can therefore be used to obtain a mechanical response, for example, with a high degree of precision. Moreover, when the measurement test is performed, there is no need to fix the steering, and therefore the steering wheel 51 can rotate freely in a released condition. When the steering wheel 51 vibrates in response to the excitation, a resulting vibration component produces a response in the torque detector 22 and the rotation detector 23, and as a result, an inertia moment of the steering wheel 51 can be identified. A method of calculating the inertia moment during the identification operation will be described below.

The input/output device 3 receives the excitation command and the response data transmitted from communication transmission unit 27 of the control device 2 in the communication reception unit 36 over the in-vehicle communication network, and transmits the received excitation command and response data to a mechanical constant calculation unit 38. The excitation command is also input into a noise characteristic calculation unit 39.

Figure 8:
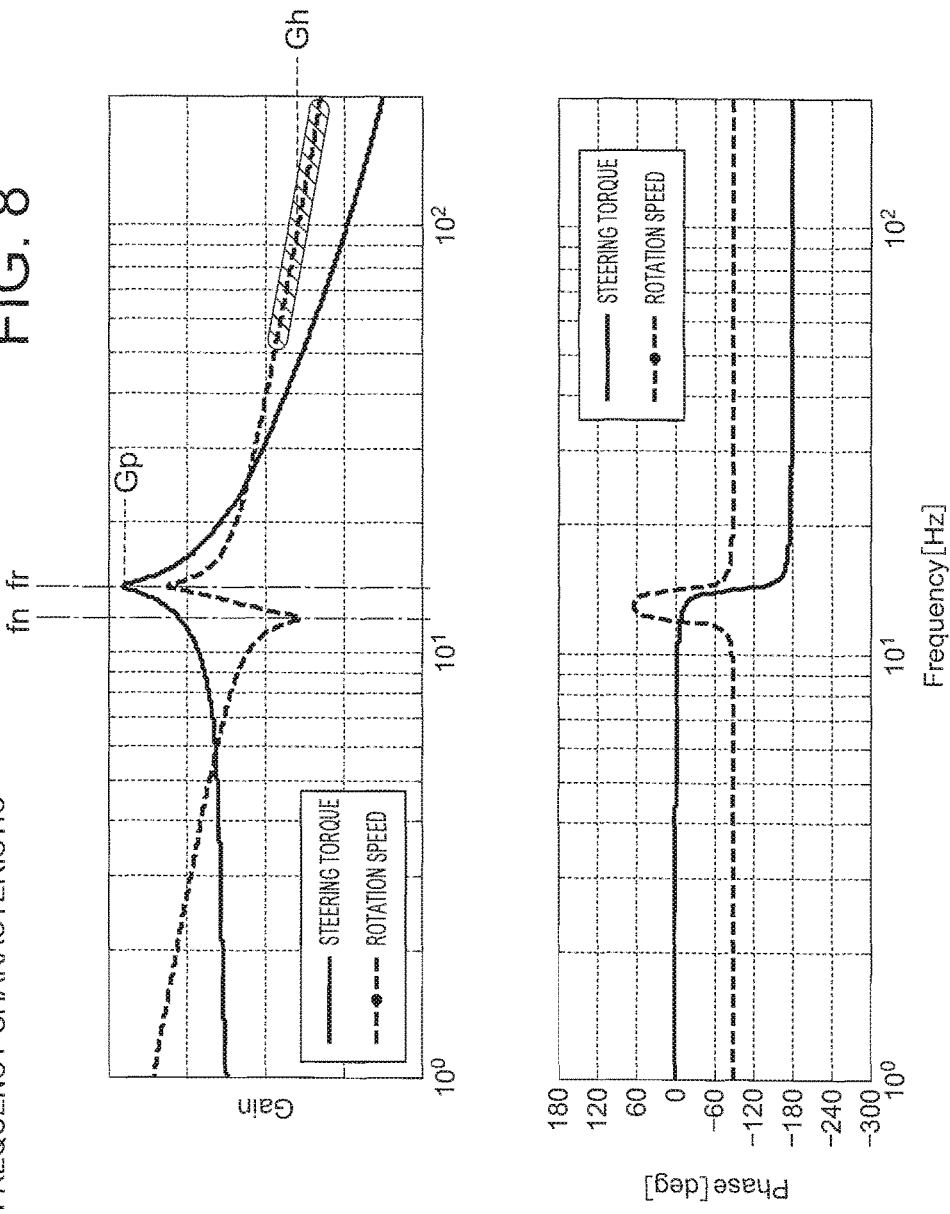
FIG. 8 is a view showing an example of a frequency characteristic of a steering according to the first embodiment of this invention.

The mechanical constant calculation unit 38 converts a transmission characteristic from the excitation command to the rotation speed signal and steering torque signal serving as the response data into a frequency characteristic, and calculates mechanical constants from the frequency characteristic. The frequency characteristic may be calculated by applying a typical, well-known method such as a spectral analysis method, a multi-decimation identification method, or a subspace method, and in so doing, a frequency characteristic including a gain characteristic and a phase characteristic plotted on a Bode diagram such as that shown in FIG. 8 can be obtained. FIG. 8 shows an example in which the subspace method is used, and instead of a Bode diagram, a mathematical model such as an equation of state or a transfer function may be obtained. In an upper section of FIG. 8, a solid line waveform denotes a gain characteristic from the excitation torque to the steering torque, and a dotted line waveform denotes a gain characteristic from the excitation torque to the rotation speed. Further, in a lower section of FIG. 8, a solid line waveform denotes a phase characteristic from the excitation torque to the steering torque, and a dotted line waveform denotes a phase characteristic from the excitation torque to the rotation speed.

Furthermore, as shown in FIG. 8, the frequency characteristic includes several feature values, and these values are also calculated by the mechanical constant calculation unit 38. A frequency fr indicated by a dot-dash line is output as a resonance frequency fr, and a frequency fn indicated by another dot-dash line is output as an anti-resonance frequency fn. Note that the resonance frequency fr is a frequency value obtained when the gain characteristic from the excitation torque to the steering torque and the gain characteristic from the excitation torque to the rotation speed, indicated respectively by the solid line and the dotted line in the upper section of FIG. 8, are at a maximum peak. Further, the anti-resonance frequency fn is a frequency value obtained when the gain characteristic from the excitation torque to the rotation speed, indicated by the dotted line in the upper section of FIG. 8, is at a minimum peak. The mechanical constant calculation unit 38 also outputs a magnitude Gp of the peak of the gain characteristic of the steering torque as a peak gain Gp. Furthermore, the mechanical constant calculation unit 38 sets 100 Hz, for example, as a representative point of a high frequency part of the gain characteristic of the rotation speed, which is shown within a frame in the upper section of FIG. 8, and outputs a gain Gh of 100 Hz as a high frequency gain Gh. The mechanical constant calculation unit 38 outputs these feature values as parts of the frequency characteristic. The unit of the frequency is Hz, but when the unit thereof is converted into rad/s, the symbols of the resonance frequency and the anti-resonance frequency become a resonance frequency ωr and an anti-resonance frequency ωn respectively.

The mechanical constant calculation unit 38 calculates the mechanical constants on the basis of the feature values of the frequency characteristic, calculated as described above. It is known that an electric power steering apparatus can be approximated by a two-inertia system including an inertial moment Jm of the motor 1 and an inertial moment Jsw of the steering wheel 51. A total of four mechanical constants, namely these two inertial moments as well as a rigidity Ks and a viscosity Cs of the torsion bar provided between the two-inertia systems, serve as unknown mechanical constants to be calculated. A relational expression between the unknown mechanical constants and the feature values of the frequency characteristic, described above, is derived from an equation of motion of the two-inertia system, as shown below in Equations (1) to (4). Here, $\omega H = 2 \times \pi \times 100$. Note that although the 100 Hz point has been selected as the high frequency gain Gh, any high frequency that is not affected by the peak, for example a point within a range of a frequency at least three times larger than the peak frequency and not exceeding the Nyquist frequency, may be used. Alternatively, $Gh \times \omega H$ may be averaged within a predetermined section of this range such that Equation (4) is modified to $Gh \times \omega H = 1/Jm$.

[Math. 1]

$$\omega_n = \sqrt{\frac{K_s}{J_{sw}}} \quad (1)$$

$$\omega_r = \sqrt{K_s \left( \frac{1}{J_m} + \frac{1}{J_{sw}} \right)} \quad (2)$$

$$G_p = \frac{K_s \cdot J_{sw}}{(J_m + J_{sw}) C_s \cdot \omega_r} \quad (3)$$

$$G_h = \frac{1}{J_m \cdot \omega_H} \quad (4)$$

Hence, four simultaneous equations shown in Equations (1) to (4) are obtained with respect to the four unknown mechanical constants, and therefore the mechanical constants can be derived by simple calculations. First, Jm is determined from Equation (4), as shown below in Equation (5). Next, Ks is determined from Equations (1) and (2) and Jm, as shown below in Equation (6). Next, Jsw is determined from Equation (1), as shown below in Equation (7), and finally, Cs is determined from Equation (3), as shown below in Equation (8).

[Math. 2]

$$J_m = \frac{1}{G_h \cdot \omega_H} \quad (5)$$

$$K_s = J_m (\omega_r^2 - \omega_n^2) \quad (6)$$

$$J_{sw} = \left( \frac{K_s}{\omega_n} \right)^2 \quad (7)$$

$$C_s = \frac{K_s \cdot J_{sw}}{(J_m + J_{sw}) G_p \cdot \omega_r} \quad (8)$$

Hence, the mechanical constants can be calculated efficiently from four equations based on algebraic calculations. The mechanical constant calculation unit 38 can calculate mechanical constants such as the inertial moments and the rigidity and viscosity of the torsion bar by simple calculations using a calculation formula employing algebraic calculations based on the feature values of the frequency characteristic, such as the resonance frequency, the anti-resonance frequency, the peak gain, and the high frequency gain. According to this method, by setting the steering apparatus as a two-inertia system and employing an equation of motion thereof, the initial moment of the steering wheel 51 can also be identified, thereby eliminating the need to halt rotation by fixing the steering wheel 51 or the like so as to form a single inertia system including the inertial moment of the motor 1 alone, and as a result, the measurement test can be simplified.

Thus, the frequency characteristic and the mechanical constants of the steering can be calculated on the basis of the excitation command and the response data.

Figure 9:
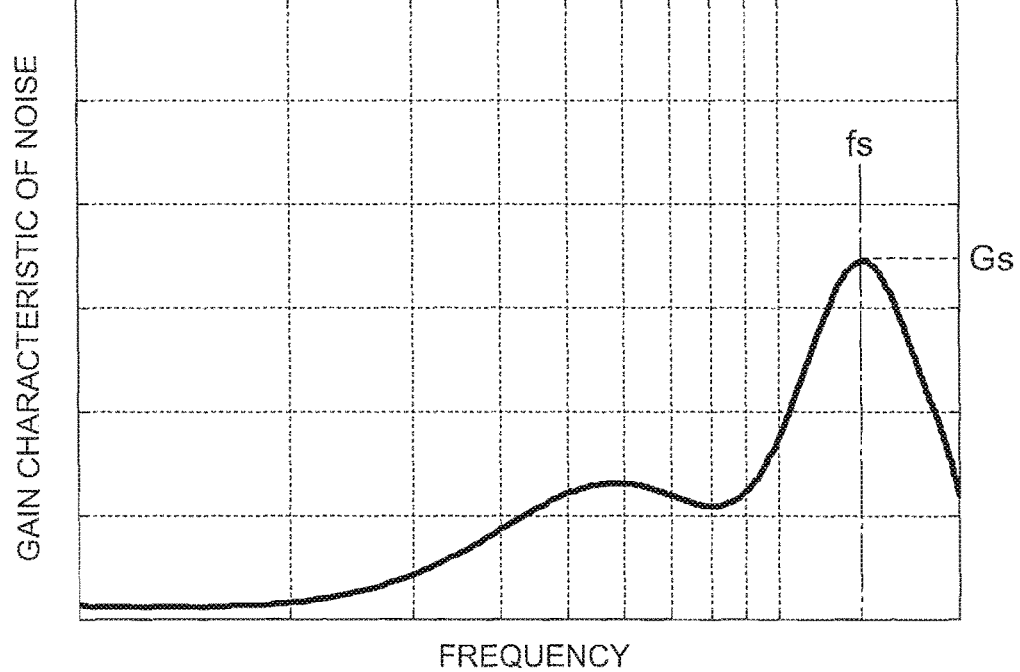
FIG. 9 is a view showing an example of a gain characteristic of noise according to the first embodiment of this invention.

The noise characteristic calculation unit 39 calculates a noise characteristic on the basis of the sound data from the microphone 37 and the excitation command from the communication reception unit 36. Similarly to calculation of the frequency characteristic by the mechanical constant calculation unit 38, a typical, well-known method may be applied to calculation of the noise characteristic. More specifically, using a spectral analysis method, a multi-decimation identification method, a subspace method, or the like, a frequency response from the excitation command to the noise characteristic is calculated, and a gain characteristic of the frequency responses is output. FIG. 9 shows the gain characteristic of the noise. A frequency of a resonance peak of the gain characteristic is output as a noise frequency fs, and a magnitude of the resonance peak is output as a noise gain Gs. Note that the excitation command has a uniform power in all frequency bands, and therefore the noise characteristic calculation unit 39 may calculate the resonance peak of the noise in a similar manner without determining the response of the sound data from the excitation command simply by subjecting the sound data to frequency analysis in order to calculate the gain characteristic. In so doing, the noise characteristic calculation unit 39 can calculate a noise characteristic serving as a frequency characteristic of the noise generated in the interior of the vehicle during excitation of the steering on the basis of the excitation command and the sound data.

Next, the display unit 32 will be described. The display unit 32 displays the frequency characteristic and the mechanical constants, input from the mechanical constant calculation unit 38, on a screen. Here, the frequency characteristic includes the Bode diagram (FIG. 8) of the steering torque and the rotation speed, and feature values such as the resonance frequency, the anti-resonance frequency, the peak gain, and the high frequency gain, while the mechanical constants include values of the inertial moments and the rigidity and viscosity of the torsion bar. Further, respective values of the gain characteristic of the noise (FIG. 9), the noise frequency fs, and the noise gain Gs, input from the noise characteristic calculation unit 39, are displayed as the noise characteristic. The user can learn these mechanical characteristics from the display unit 32 and use the mechanical characteristics to adjust control constants or the like.

As described above, the input/output device 3 according to this embodiment is connected, via the in-vehicle communication network provided in the vehicle, to the control device 2 for controlling the motor provided in the electric power steering apparatus that generates an auxiliary steering force applied to the steering provided in the vehicle, and on the basis of the externally input excitation start instruction, the input/output device 3 generates the excitation start instruction signal for starting excitation in the motor transmits the excitation start instruction signal to the control device 2 over the in-vehicle communication network, and receives the response data relating to the excitation of the electric power steering apparatus, the response data being detected by the control device 2 while the excitation is underway, from the control device 2 over the in-vehicle communication network. Hence, excitation can be performed using the motor 1 and the control device 2, which are provided in the electric power steering apparatus as mass-produced components of the vehicle, whereupon the response data detected by the control device 2 can be transmitted to the input/output device 3 by communication and used therein. As a result, striking effect not present in the prior art, namely that the mechanical characteristics can be identified easily by means of a simple configuration, can be obtained. Note that in the prior art, as described above, a control device used only for excitation is provided, and direct AD conversion or the like is performed on the response data using a testing device such as a data logger that is not a mass-produced component of the vehicle. Hence, a complicated configuration is required, leading to an increase in laboriousness due to the need for operations such as alternately connecting sensor wires and drive system wires. In this embodiment, on the other hand, the mechanical constants can be identified simply by preparing, in addition to a mass-produced vehicle, the input/output device 3, for which a typical tablet computer, laptop type personal computer, or the like is used, and laying the in-vehicle communication network cable. As a result, large reductions in structural complexity and laboriousness are obtained.

Furthermore, the steering measurement device according to this embodiment includes the control device 2 for controlling the motor provided in the electric power steering apparatus that generates an auxiliary steering force applied to the steering provided in the vehicle, and the input/output device 3 connected to the control device 2 via the in-vehicle communication network provided in the vehicle. The input/output device 3 includes the excitation start instruction generation unit 33 that generates the excitation start instruction signal for starting excitation in the motor 1 on the basis of the externally input excitation start instruction, transmits the excitation start instruction signal to the control device 2 over the in-vehicle communication network, and receives the response data relating to the excitation of the electric power steering apparatus, the response data being detected by the control device 2 while the excitation is underway, from the control device 2 over the in-vehicle communication network. The control device 2, having received the excitation start instruction from the input/output device 3, excites the motor 1, detects the response of the electric power steering apparatus to the excitation while the excitation is underway, and transmits the response to the input/output device 3 as the response data. Hence, excitation can be performed using the motor 1 and the control device 2, which are provided in the electric power steering apparatus as mass-produced components of the vehicle, whereupon the response data detected by the control device 2 can be transmitted to the input/output device 3 by communication and used therein. As a result, a striking effect not present in the prior art, namely that the mechanical characteristics can be identified easily by means of a simple configuration, can be obtained. Note that in the prior art, as described above, a control device used only for excitation is provided, and direct AD conversion or the like is performed on the response data using a testing device such as a data logger that is not a mass-produced component of the vehicle. Hence, a complicated configuration is required, leading to an increase in laboriousness due to the need for operations such as alternately connecting sensor wires and drive system wires. In this embodiment, on the other hand, the mechanical constants can be identified simply by preparing, in addition to a mass-produced vehicle, the input/output device 3, for which a typical tablet computer, laptop type personal computer, or the like is used, and laying the in-vehicle communication network cable. As a result, large reductions in structural complexity and laboriousness are obtained.

Moreover, according to this embodiment, the excitation start instruction, which serves as an excitation start timing signal, can be transmitted from the input/output device 3 such that the actual excitation can be performed in real time by the control device 2 even when an in-vehicle communication network having a low communication speed is used, and as a result, excitation can be performed up to a high frequency component. Furthermore, the response data are detected by the detectors 22, 23 of the control device 2 in real time, and therefore response data including a high frequency component can be detected with a high degree of precision, whereupon the input/output device 3 can receive the detected response data including the high frequency component via the in-vehicle communication network. In other words, the control device 2 can perform actual excitation and response detection in real time even when an in-vehicle communication network having a low communication speed is used, and as a result, further striking effects are obtained, namely that excitation and measurement can be performed up to a high frequency component and the characteristics of the steering can be measured with a high degree of precision.

Further, according to this embodiment, the control device 2 includes the excitation command generation unit 25 that generates the excitation command for exciting the motor 1, and upon reception of the excitation start instruction from the input/output device 3, starts to excite the motor 1 on the basis of the excitation command. Therefore, excitation including a high frequency component can be realized using the control device 2 upon reception of the instruction from the input/output device 3, which is connected thereto by the in-vehicle communication network having a low data transmission speed, and as a result, the mechanical constants can be identified with a high degree of precision.

When a different configuration to the configuration of this embodiment is provided such that an excitation command is transmitted from the input/output device to the control device over the in-vehicle communication network as required or the like instead of transmitting the excitation start instruction to the control device, the maximum frequency of the excitation command that can be transmitted is limited by the transmission speed of the network, and therefore excitation cannot be performed at a high frequency component. As a result, the mechanical constants cannot be identified with a high degree of precision.

In this embodiment, to solve the problem described above, the control device 2 is provided with the excitation command generation unit 25 that generates the excitation command, and therefore excitation including a high frequency component can be realized. As a result, the mechanical constants can be identified with a high degree of precision.

Moreover, in this embodiment, the control device 2 transmits the excitation command corresponding to the response data as well as the response data to the input/output device 3 over the in-vehicle communication network, and therefore frequency analysis can be performed by the input/output device 3 on the basis of a synchronized combination of the excitation command and the response data with no wasteful delay time therebetween. Accordingly, the frequency characteristic can be calculated with a high degree of precision up to a high frequency component, and as a result, the mechanical constants can be identified precisely.

Furthermore, in this embodiment, the input/output device 3 includes the mechanical constant calculation unit 38 that calculates the mechanical constants representing the mechanical characteristics of the steering on the basis of the response data detected during excitation, and therefore the mechanical constants can be identified with a high degree of precision by a high-performance calculation device of the input/output device 3—an external terminal—from the viewpoint of mass produced in-vehicle devices.

Further, in this embodiment, at least one of the steering torque detected by the torque detector 22 and the rotation speed detected by the rotation detector 23 is used as the response data, and therefore mechanical response characteristics of the respective detectors 23, 22 that detect these values can also be identified.

Moreover, in this embodiment, the input/output device 3 includes the microphone 37 that serves as a sound detector for detecting the sound generated in the interior of the vehicle during excitation and outputting sound data, and therefore the noise characteristic can likewise be identified by means of a simple configuration.

Furthermore, in this embodiment, the input/output device 3 includes the display unit 32 that displays at least one of the response data, the sound data, and the mechanical constants, and therefore identification results can be confirmed by the user easily.

Further, in this embodiment, the input/output device 3 includes the amplitude input unit 34 for inputting the excitation amplitude value indicating the amplitude value of the excitation command by which the motor 1 is to be excited, and the excitation amplitude value is transmitted to the control device 2 over the in-vehicle communication network. Hence, the user can adjust the excitation amplitude value or set the excitation amplitude value at a recommended value to ensure that the excitation amplitude does not lead to excessive rotation and is not drowned out by friction, and as a result, the mechanical constants can be identified with a high degree of precision.

Moreover, in this embodiment, the excitation command generation unit 25 generates the excitation command using random numbers or pseudorandom numbers, and therefore a plurality of frequency components can be superimposed in the vicinity of an identical time so that the excitation period can be shortened. As a result, the mechanical constants can be identified quickly and precisely.

Furthermore, the motor 1 is excited with the steering wheel 51 in a released condition, and therefore the steering wheel 51 can vibrate in response to the excitation command. As a result, the inertial moment of the steering wheel 51 can also be identified.

Further, similarly to the configuration described above, in which the microphone 37 is used as the sound detector so that sound data are taken into the input/output device 3, an acceleration pickup sensor may be attached to a location of the electric power steering device or the vehicle in which attention is to be focused on the vibration, and acceleration information from the acceleration pickup sensor may be taken into the input/output device 3. In this case, a vibration characteristic in the attachment location of the acceleration pickup sensor can be obtained in a similar manner to the noise characteristic and used by the user to adjust the control constants and so on.

Moreover, in the above description, the measurement test is performed at only one operating point, but instead, the measurement test may be performed by, for example, applying an offset current of a predetermined fixed value to the current command or the like in order to vary a load condition in several patterns. More specifically, the input/output device 3 is configured so that the user can input an offset current therein in a similar manner to the excitation amplitude value, and the excitation command generation unit 25 sets a value obtained by adding the offset current to the excitation command as a new excitation command. The display unit 32 then displays the mechanical constants for each offset current. With this configuration, the mechanical constants can be identified at each operating point, i.e. each load condition or the like, even when the mechanical constants vary at each operating point.

Second Embodiment

In the first embodiment, described above, the excitation command is generated by the control device 2, but in this embodiment, the excitation command is generated by the input/output device 3, stored temporarily in a storage unit of the control device 2, and then reproduced. Otherwise, the second embodiment is identical to the first embodiment.

Figure 4:
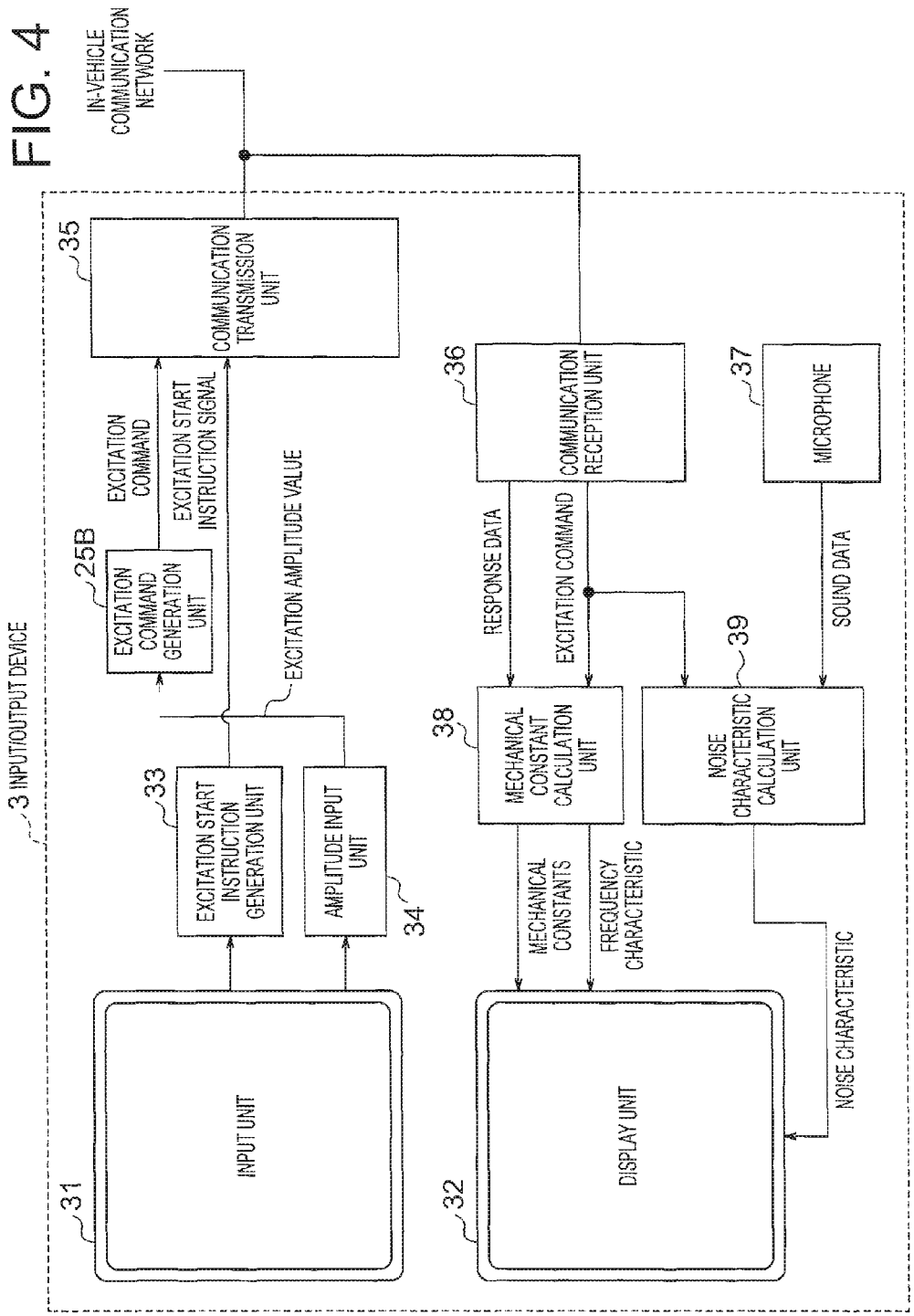
FIG. 4 is a block diagram showing an input/output device according to a second embodiment of this invention.

FIG. 4 shows a configuration of the input/output device 3 according to the second embodiment. The configuration shown in FIG. 4 differs from the configuration of the first embodiment, shown in FIG. 3, in that an excitation command generation unit 25E is added between the amplitude input unit 34 and the communication transmission unit 35. This difference will be described below.

The excitation command generation unit 25B provided in the input/output device 3 receives the excitation amplitude value directly from the amplitude input unit 34, calculates the excitation command in advance while on standby, even when the excitation start instruction has not yet been issued, and transmits the calculated excitation command to the communication transmission unit 35. The excitation command generation unit 25B generates the excitation command using a similar method to the excitation command generation unit 25 according to the first embodiment, and as long as care is taken to ensure that the calculation period ΔT is aligned with the calculation period of the control device 2, the excitation command can be generated in a similar manner.

Figure 5:
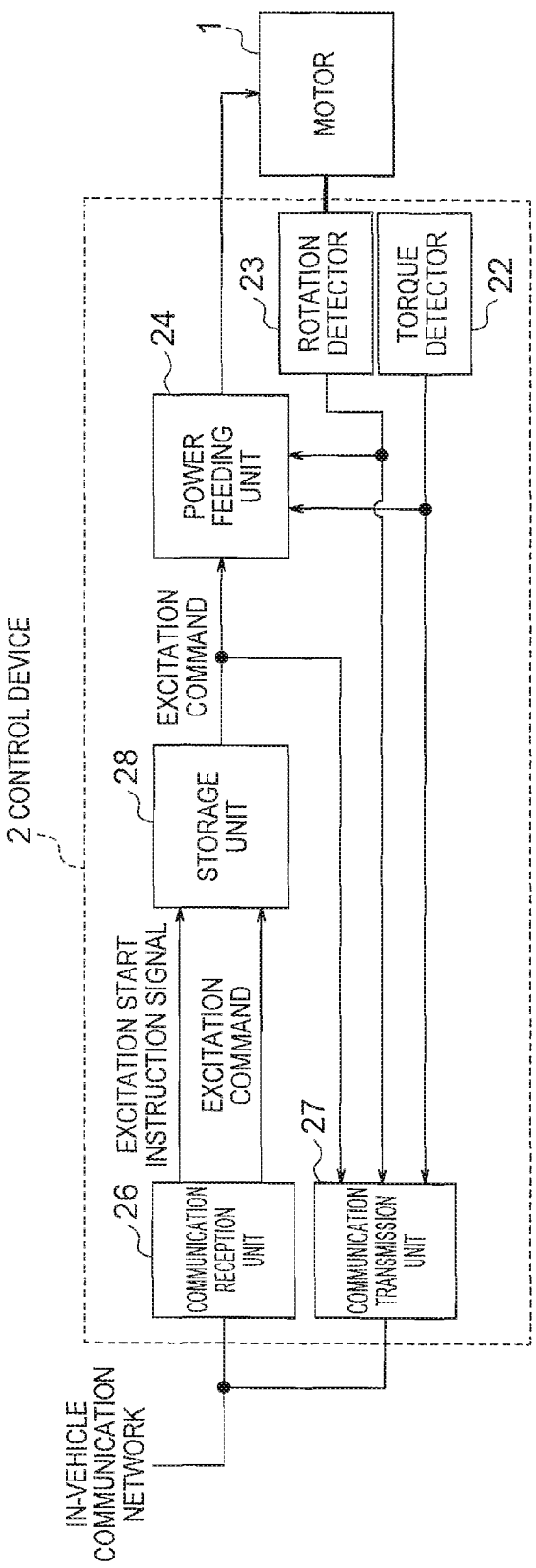
FIG. 5 is a block diagram showing a control device according to the second embodiment of this invention.

FIG. 5 shows a configuration of the control device 2 according to the second embodiment. The configuration shown in FIG. 5 differs from the configuration of the first embodiment, shown in FIG. 2, in that a storage unit 28 is provided in place of the excitation command generation unit 25 of FIG. 2. This difference will now be described. The control device 2 receives the excitation command, transmitted from the input/output device 3 over the in-vehicle communication network, in the communication reception unit 26, and stores the received excitation command in the storage unit 28. When the excitation start instruction signal transmitted from the input/output device 3 is input into the storage unit 28 via the communication reception unit 26, the storage unit 28 outputs the stored excitation command at the moment when the pulse of the excitation start instruction signal is received, whereby the excitation command is input into the power feeding unit 24 and the communication transmission unit 27.

With this configuration, even though the excitation command generated by the input/output device 3 is transmitted to the control device 2 over the in/vehicle communication network having a low communication speed, all of the waveform data of the excitation command can be stored in the storage unit 28 of the control device 2 temporarily prior to the test. Hence, the frequency band of the excitation command can be set regardless of the communication speed, and as a result, the excitation command can be output from the storage unit 28 of the control device 2 in real time such that high frequency components are realized. Note that the excitation command generation unit 25B of the input/output device 3 does not necessarily have to calculate the excitation command in real time, and may calculate the excitation command at a low calculation speed. The reason for this is that when the excitation command is reproduced in the control device 2 during the actual excitation, high frequencies can be realized in real time.

With the configuration according to the second embodiment, the excitation command is generated by the input/output device 3 and stored in advance in the storage unit 28 of the control device 2 so as to be usable thereby. As a result, the excitation command can be realized up to a high frequency component in real time by the control device 2, and therefore similar effects to the first embodiment are obtained.

According to the second embodiment, as described above, similar effects to the first embodiment are obtained. Moreover, in the second embodiment, the input/output device 3 includes the excitation command generation unit 25E that generates the excitation command for exciting the motor 1, the excitation command for exciting the motor 1 is transmitted to the control device 2 over the in-vehicle communication network prior to implementation of the test, the control device 2 includes the storage unit 28 for storing the received excitation command, and the motor 1 is excited on the basis of the excitation command stored in the storage unit 28. Hence, a load exerted on the control device 2 can be lightened, and the excitation command can be realized up to a high frequency component in real time by the control device 2. As a result, the mechanical constants can be identified with a high degree of precision.

Third Embodiment

In the first embodiment, described above, the excitation amplitude value specified by the user is set in the input/output device 3 using the amplitude input unit 34. In a third embodiment, on the other hand, an amplitude setting unit 310 is provided in the input/output device 3 in place of the amplitude input unit 34, and the excitation amplitude value is set automatically by the amplitude setting unit 310. Otherwise, the third embodiment is identical to the first embodiment.

Figure 6:
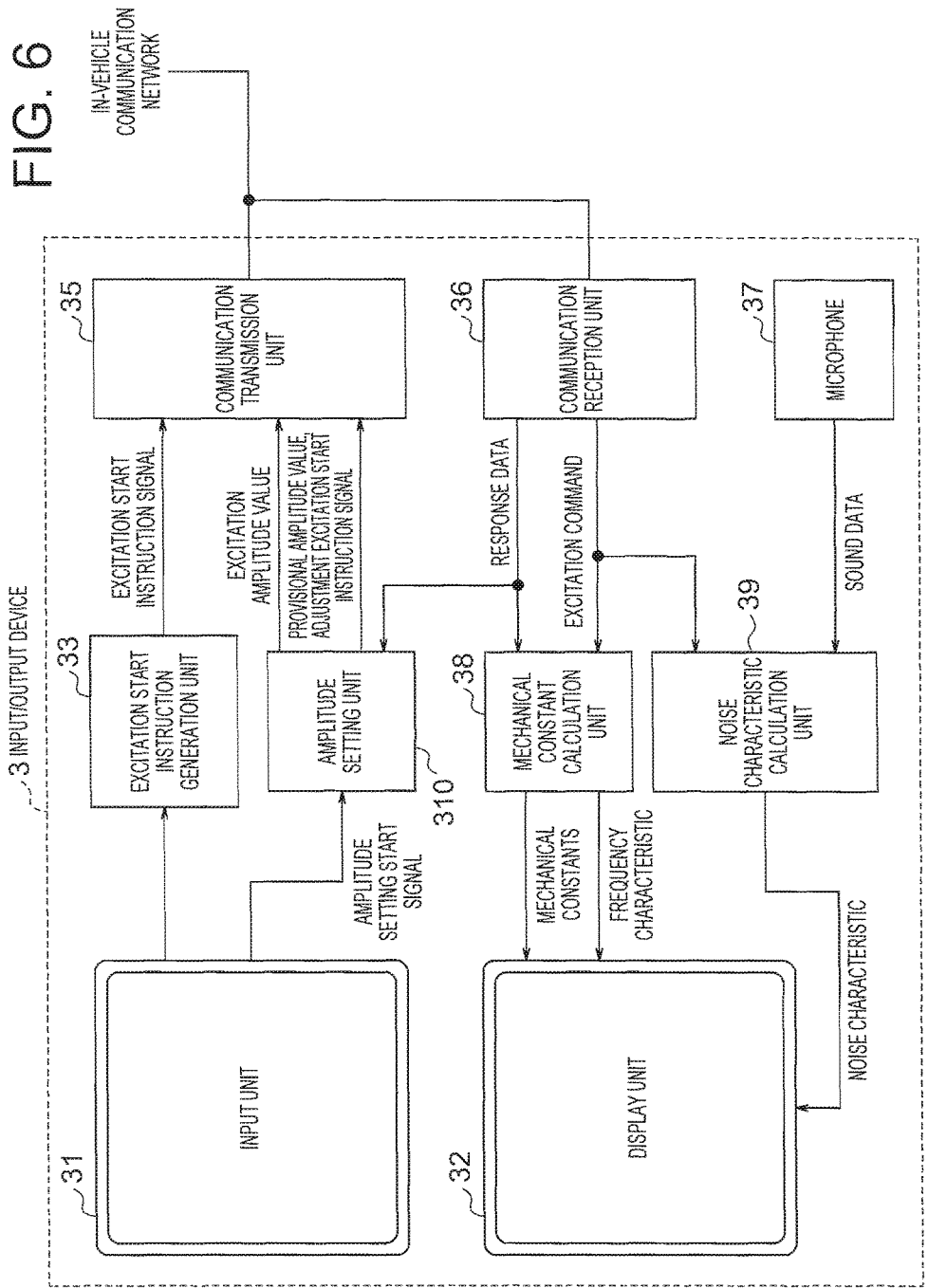
FIG. 6 is a block diagram showing an input/output device according to a third embodiment of this invention.

FIG. 6 shows a configuration of the input/output device 3 according to the third embodiment. The configuration shown in FIG. 6 differs from the configuration of the first embodiment, shown in FIG. 3, in that the amplitude setting unit 310 is provided between the input unit 31 and the communication transmission unit 35 in place of the amplitude input unit 34 of FIG. 3. This difference will be described below.

In this embodiment, the input unit 31 includes an amplitude setting start operation unit (not shown) constituted by a touch panel display or a keyboard and a mouse, and the user inputs an amplitude setting start signal into the amplitude setting unit 310 by operating the amplitude setting start operation unit.

Figure 10:
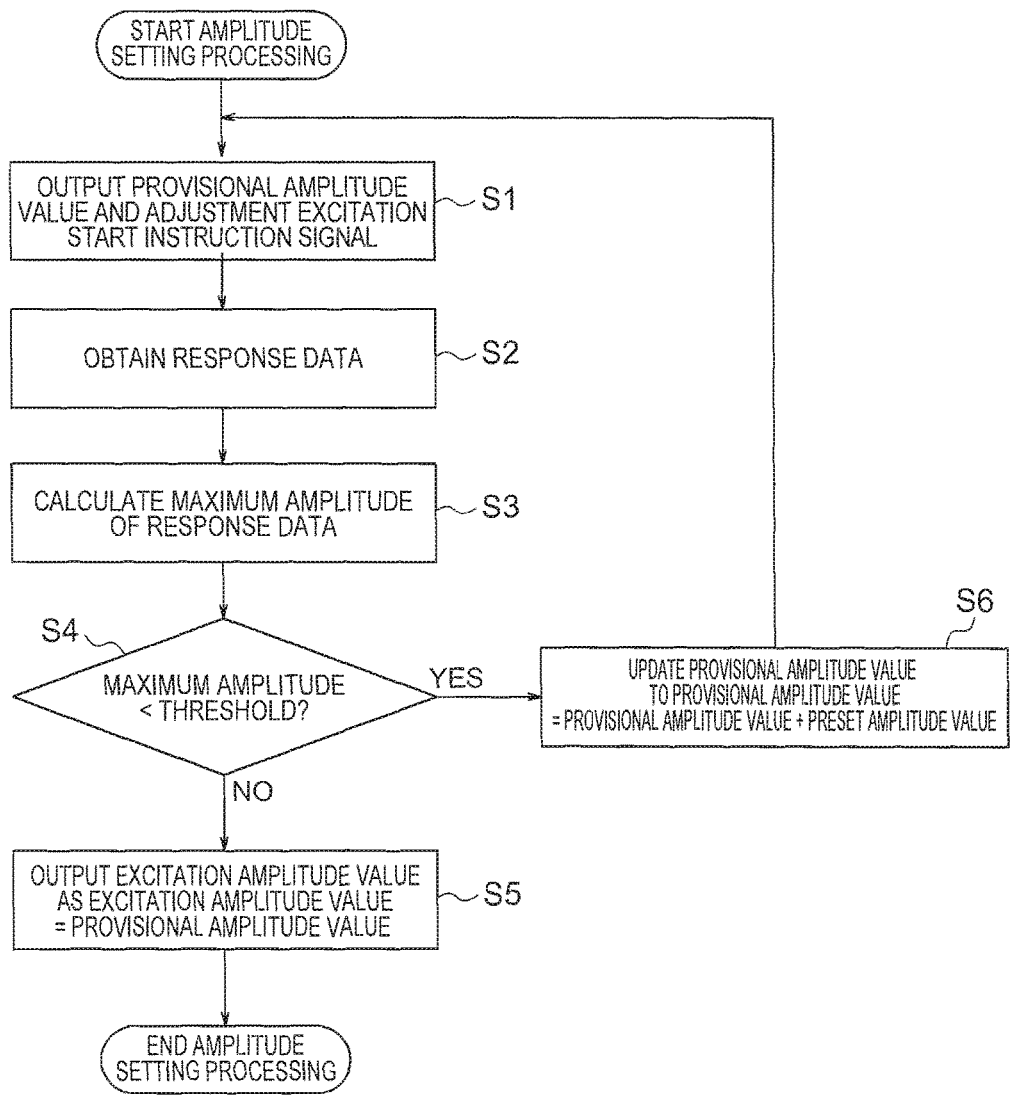
FIG. 10 is a flowchart showing amplitude setting processing according to the third embodiment of this invention.

The amplitude setting unit 310 begins amplitude setting processing in accordance with a flowchart shown in FIG. 10 when the amplitude setting start signal is input therein. First, the amplitude setting unit 310 outputs a provisional amplitude value set in advance at a minimum value serving as a default value, and an adjustment excitation start instruction signal, whereupon the provisional amplitude value and the adjustment excitation start instruction signal are input into the communication transmission unit 35 (step S1). The communication transmission unit 35 transmits the provisional amplitude value and the adjustment excitation start instruct ion signal to the control device 2 over the in-vehicle communication network. The control device 2 receives the provisional amplitude value and the adjustment excitation start instruction signal as the excitation amplitude value and the excitation start instruction signal, respectively, and then, similarly to the first embodiment, performs control such that excitation torque is output from the motor 1 and transmits the obtained response data to the input/output device 3 over the in-vehicle communication network. The amplitude setting unit 310 receives the response data, which serve as a response to excitation at the provisional amplitude value, via the communication reception unit 36 (step S2), and extracts a maximum amplitude of the steering torque signal or the rotation speed signal from the response data (step S3). Next, the amplitude setting unit 310 determines whether or not the maximum amplitude is smaller than a preset threshold (step S4), and when the maximum amplitude is smaller than the threshold, updates the provisional amplitude value to an increased value by adding a preset amplitude value to the provisional amplitude value (step S6). The amplitude setting unit 310 then returns to the processing of step S1 in order to output the updated provisional amplitude value and the adjustment excitation start instruction signal, whereupon excitation for adjusting the amplitude is performed again. When, on the other hand, the maximum amplitude is not smaller than the threshold, or in other words when the maximum amplitude equals or exceeds the threshold, the amplitude setting unit 310 outputs the provisional amplitude value set at that time as the excitation amplitude value, and then terminates the amplitude setting processing (step S5). By gradually increasing the excitation amplitude value in steps and repeatedly implementing excitation for adjusting the amplitude until the maximum amplitude reaches the preset threshold in this manner, the provisional amplitude at the point where the maximum amplitude reaches the threshold is output as a final excitation amplitude value. Here, the threshold is set within a range no smaller than a value at which the excitation torque is not drowned out by friction and no larger than an upper limit value at which the steering does not rotate excessively.

According to the third embodiment, as described above, similar effects to the first embodiment are obtained. Moreover, in the third embodiment, the input/output device 3 includes the amplitude setting unit 310 that automatically sets the excitation amplitude value indicating the amplitude value of the excitation command by which the motor 1 is to be excited, and the excitation amplitude value is gradually increased in steps until the response data reach a preset threshold, whereupon the excitation amplitude value is transmitted to the control device 2 over the in-vehicle communication network. Hence, the amplitude can be set automatically at an optimum value so as to obtain an excitation command that does not lead to excessive rotation and is not drowned out by friction, and as a result, the mechanical constants can be identified with a high degree of precision.

Fourth Embodiment

In the first embodiment, described above, the input/output device 3 displays the calculated mechanical constants on the display unit 32, whereas in a fourth embodiment, a control constant calculation unit 311 is provided to calculate the control constants used by the control device 2 on the basis of the mechanical constants. Otherwise, the fourth embodiment is identical to the first embodiment.

FIG. 11 shows a configuration of the input/output device 3 according to the fourth embodiment. The configuration shown in FIG. 11 differs from the configuration of the first embodiment, shown in FIG. 3, in that the control constant calculation unit 311 is provided between the display unit 32 and the input unit 31 and mechanical constant calculation unit 38. This difference will be described below.

The control device 2 of the electric power steering apparatus typically performs inertia compensation control and viscosity compensation control, which are respectively realized by causing the motor to behave such that the inertial moment thereof is reduced and causing the steering to behave such that the viscosity thereof is increased. This is achieved by a configuration such as that disclosed in paragraphs 0034 to 0036 of Japanese Patent Application Publication No. 2001-171539, for example. More specifically, an inertia compensation current that is commensurate with a rotary acceleration is calculated in order to apply a rotary force to the motor 1 in an identical direction to the rotary acceleration, and a viscosity compensation current that is commensurate with the rotation speed is calculated in order to apply a rotary force to the motor 1 in an opposite direction to the rotation speed. Control is then performed so that the current follows a target current, or in other words a current command, determined by adding together the inertia compensation current and the viscosity compensation current. Here, a gain expressing this proportional relationship is defined as follows. When an inertia compensation gain Jmc is multiplied by the rotary acceleration, the inertia compensation current is obtained, and when a viscosity compensation gain Csc is multiplied by the rotation speed, the viscosity compensation current is obtained.

Next, a target inertial moment of the motor 1 is set as a target inertial moment Jm*, and a target viscosity coefficient of the steering is set as a target viscosity coefficient Cs*. These values will be referred to together as target constants. At this time, optimum compensation gain values can be derived respectively as follows using actually identified values of the inertial moment Jm and the viscosity Cs.

$$Jmc=Jm-Jm* \quad (9)$$

$$Csc=Cs-Cs* \quad (10)$$

In the fourth embodiment, in consideration of these relationships, the control constant calculation unit 311 is configured as follows. As shown in FIG. 11, the input/output device 3 according to the fourth embodiment includes the control constant calculation unit 311. In the fourth embodiment, the input unit 31 includes a target constant input unit (not shown) constituted by a touch panel display or a keyboard and a mouse on which the user inputs values of the target inertial moment Jm* and the target viscosity coefficient Cs* as the target constants. The target constants input by the user are then transmitted to the control constant calculation unit 311. The mechanical constants calculated by the mechanical constant calculation unit 38 are also input into the control constant calculation unit 311. On the basis of the mechanical constants and the target constants, the control constant calculation unit 311 calculates the inertia compensation gain Jmc and the viscosity compensation gain Csc from Equation (9) and Equation (10), and transmits the calculated values to the display unit 32 as the control constants of the control device 2. The display unit 32 displays the control constants on a screen.

According to the fourth embodiment, as described above, similar effects to the first embodiment are obtained. Moreover, in the fourth embodiment, the input/output device 3 includes the control constant calculation unit 311 that calculates the control constants from the mechanical constants calculated by the mechanical constant calculation unit 38, and therefore the control constants can be calculated automatically on the basis of the precisely identified mechanical constants. As a result, a process for adjusting the control constants can be eliminated.

Note that in the first to fourth embodiments, the rotation detector 23 detects the rotation speed of the motor 1, but the invention is not limited to this case, and a rotation angle may be detected instead. The rotation angle is obtained by integrating the rotation speed, and therefore a gradient of the calculated gain diagram increases in overall steepness by 20 dB/dec and the overall phase characteristic decreases by 90 degrees. However, the resonance and anti-resonance frequencies remain the same. By multiplying $\omega H$ by the high frequency gain Gh, the high frequency gain Gh can be corrected, and as a result, the mechanical constants can be identified in a similar manner.

Further, in the first to fourth embodiments, the control device 2 may further include a current detector that detects a current flowing through the motor 1, and by adding a current detection signal to the response data, a frequency characteristic from the excitation command to the current detection signal may be calculated by the input/output device 3.

Furthermore, in the first to fourth embodiments, the mechanical constant calculation unit 38 calculates the frequency characteristic from the excitation command to the steering torque, rotation speed, and rotation angle, and identifies the mechanical constants on the basis of the frequency characteristic, but instead, the mechanical constant calculation unit 38 may calculate the frequency characteristic from the current detection signal to the steering torque, rotation speed, and rotation angle and calculate the mechanical constants on the basis of the frequency characteristic. The current detection signal normally follows the current command up to a sufficiently high frequency, and therefore, when the excitation command is generated as a current command, the current detection signal is substantially identical to the excitation command. Hence, the mechanical constants can be identified in a similar manner.

Further, in the first to fourth embodiments, at least one of the steering torque, the rotation speed, the rotation angle, and the detected current is used as the response data, and therefore a mechanical response characteristic from the excitation command to the respective detectors that detect these values can be identified.

REFERENCE SIGNS LIST

1 Motor, 2 Control device, 3 Input/output device, 4 In-vehicle communication network cable, 22 Torque detector, 23 Rotation detector, 24 Power feeding unit, 25, 25B Excitation command generation unit, 26 Communication reception unit, 27 Communication transmission unit, 28 Storage unit, 31 Input unit, 32 Display unit, 33 Excitation start instruction generation unit, 34 Amplitude input unit, 35 Communication transmission unit, 36 Communication reception unit, 37 Microphone, 38 Mechanical constant calculation unit, 39 Noise characteristic calculation unit, 310 Amplitude setting unit, 311 Control constant calculation unit, 51 Steering wheel, 53 Steering shaft, 54 Rack and pinion gear, 55 Vehicle wheels, 56 Tie rod, 57 Knuckle arm.

The invention claimed is:

1. An input/output device connected, via an in-vehicle communication network provided in a vehicle, to a control device which controls a motor that is provided in an electric power steering apparatus and generates an auxiliary steering force applied to a steering provided in the vehicle, the input/output device being configured to:
generate a vibration start instruction signal to start vibration in the motor based on a vibration start instruction input from outside,
transmit the vibration start instruction signal to the control device over the in-vehicle communication network,
receive response data from the electric power steering apparatus which corresponds to the vibration start instruction signal, the response data being detected by the control device while the vibration is underway, from the control device over the in-vehicle communication network, and
identify mechanical characteristics of the steering from the response data,
wherein the mechanical characteristics include a transmission characteristic from an excitation command, by which the motor is excited, to the response data,
wherein the input/output device comprises a mechanical constant calculation unit that calculates a mechanical constant indicating a mechanical characteristic of the electric power steering apparatus based on the response data, and
wherein the input/output device comprises a control constant calculation unit that calculates a control constant of the control device from the mechanical constant calculated by the mechanical constant calculation unit.

2. The input/output device according to claim 1, wherein the response data include at least one of a steering torque exerted on the steering, a rotation angle of the motor, a rotation speed of the motor, and a detected current of the motor.

3. The input/output device according to claim 1, wherein the input/output device comprises a sound detector that detects sound generated in the vehicle during the vibration and outputs the detected sound as sound data.

4. The input/output device according to claim 3, wherein the input/output device comprises a display that displays the response data, the sound data, or the mechanical constant.

5. The input/output device according to claim 1, wherein the input/output device comprises an amplitude input unit that receives an amplitude value input from outside and indicating a vibration amplitude value of a vibration command by which the motor is to be vibrated, sets the amplitude value as the vibration amplitude value of the vibration command, and transmits the set vibration amplitude value to the control device over the in-vehicle communication network.

6. The input/output device according to claim 1, wherein the input/output device comprises an amplitude setting unit that sets the vibration amplitude value of the vibration command by which the motor is to be vibrated based on the response data, and transmits the set vibration amplitude value to the control device over the in-vehicle communication network.

7. The input/output device according to claim 1, wherein communication speed within the in-vehicle communication network is slower than communication speed within the control device.

8. The input/output device according to claim 1, wherein the mechanical constant and the control constant relate to inertial moment and viscosity.

9. A steering measurement device comprising: an input/output device connected, via an in-vehicle communication network provided in a vehicle, to a control device which controls a motor that is provided in an electric power steering apparatus and generates an auxiliary steering force applied to a steering provided in the vehicle, the input/output device being configured to:
generate a vibration start instruction signal to start vibration in the motor based on a vibration start instruction input from outside,
transmit the vibration start instruction signal to the control device over the in-vehicle communication network,
receive response data from the electric power steering apparatus which corresponds to the vibration start instruction signal, the response data being detected by the control device while the vibration is underway, from the control device over the in-vehicle communication network, and
identify mechanical characteristics of the steering from the response data,
wherein the mechanical characteristics include a transmission characteristic from an excitation command, by which the motor is excited, to the response data,
wherein the input/output device comprises a mechanical constant calculation unit that calculates a mechanical constant indicating a mechanical characteristic of the electric power steering apparatus based on the response data, and
wherein the input/output device comprises a control constant calculation unit that calculates a control constant of the control device from the mechanical constant calculated by the mechanical constant calculation unit; and
a control device that is connected to the input/output device via the in-vehicle communication network provided in the vehicle in order to control the motor provided in the electric power steering apparatus that generates an auxiliary steering force applied to the steering provided in the vehicle, wherein the control device vibrates the motor upon reception of the vibration start instruction signal from the input/output device, detects a response of vibrating from the electric power steering apparatus during the vibration, and transmits the detected response to the input/output device as the response data.

10. The steering measurement device according to claim 9, wherein the control device comprises a vibration command generation unit that generates the vibration command by which the motor is to be vibrated, and
the control device vibrates the motor based on the vibration command generated by the vibration command generation unit upon reception of the vibration start instruction signal from the input/output device.

11. The steering measurement device according to claim 10, wherein the vibration command generation unit generates the vibration command using random numbers or pseudorandom numbers.

12. The steering measurement device according to claim 9, wherein the input/output device comprises a vibration command generation unit that generates the vibration command by which the motor is to be vibrated, and
the input/output device transmits the vibration command generated by the vibration command generation unit to the control device over the in-vehicle communication network, and
the control device comprises a storage unit that stores the vibration command received from the input/output device, and
vibrates the motor based on the vibration command stored in the storage unit upon reception of the vibration start instruction signal from the input/output device.

13. The steering measurement device according to claim 9, wherein the control device transmits the response data and the vibration command corresponding thereto to the input/output device over the in-vehicle communication network.

14. The steering measurement device according to claim 9, wherein the control device vibrates the motor in a condition where a steering wheel of the electric power steering apparatus is released.

15. A control device which controls a motor that is provided in an electric power steering apparatus and generates an auxiliary steering force applied to a steering provided in a vehicle, the control device being connected, via an in-vehicle communication network, to an input/output device that generates a vibration start instruction signal to start vibration in the motor so as to identify mechanical characteristics of the steering based on response data from the control device,
the control device being configured to vibrate the motor upon reception of the vibration start instruction signal from the input/output device, detect a response indicating a vibration of the electric power steering apparatus from the electric power steering apparatus while the vibration is underway, and transmit the detected response to the input/output device as the response data,
wherein communication speed within the in-vehicle communication network is slower than communication speed within the control device,
wherein the mechanical characteristics include a transmission characteristic from an excitation command by which the motor is excited, to the response data,
wherein the input/output device comprises a mechanical constant calculation unit that calculates a mechanical constant indicating a mechanical characteristic of the electric power steering apparatus based on the response data, and
wherein the input/output device comprises a control constant calculation unit that calculates a control constant of the control device from the mechanical constant calculated by the mechanical constant calculation unit.

16. The input/output device according to claim 15, wherein the mechanical constant and the control constant relate to inertial moment and viscosity.

* * * * *